United States Patent [19]

Rabinovich

[11] Patent Number: 5,578,227
[45] Date of Patent: Nov. 26, 1996

[54] RAPID PROTOTYPING SYSTEM

[76] Inventor: Joshua E. Rabinovich, 15 Voss Ter., Newton, Mass. 02159

[21] Appl. No.: 113,241

[22] Filed: Aug. 30, 1993

[51] Int. Cl.[6] .......................... B23K 26/00; B21F 45/00; B29C 41/02; B29C 71/04
[52] U.S. Cl. ................. 219/121.63; 156/180; 156/272.8; 219/76.14; 219/121.64
[58] Field of Search ......................... 219/121.63, 121.64, 219/121.82, 121.84, 121.65, 121.66, 121.13, 121.14, 121.15, 121.16, 121.17, 121.47, 76.15, 76.16, 76.14, 73.11; 364/468; 156/272.8, 180, 166, 296

[56] References Cited

U.S. PATENT DOCUMENTS

| | | | |
|---|---|---|---|
| 1,533,300 | 4/1925 | Baker | 219/76.14 |
| 3,156,968 | 11/1964 | White, Jr. | 219/76.14 |
| 3,558,846 | 1/1971 | Ujiie | 219/76.14 |
| 3,737,616 | 6/1973 | Ujiie | 219/73.11 |
| 3,821,840 | 7/1974 | Kershaw | 219/76.14 |
| 3,952,180 | 4/1976 | Gnanamuthu | 219/121.64 |
| 4,323,756 | 4/1982 | Brown et al. | 219/121.66 |
| 4,575,330 | 3/1986 | Hull . | |
| 4,743,733 | 5/1988 | Mehta et al. | 219/121.66 |
| 4,803,334 | 2/1989 | Burke et al. | 219/121.64 |
| 4,841,617 | 6/1989 | Schmidt et al. | 219/121.64 X |
| 4,857,693 | 8/1989 | Rump | 219/76.14 |
| 4,863,538 | 9/1989 | Deckard | 219/121.63 |
| 4,931,125 | 6/1990 | Volkmann et al. | 219/121.64 X |
| 4,947,463 | 8/1990 | Matsuda et al. | 219/121.84 |
| 5,038,014 | 8/1991 | Pratt et al. | 219/121.64 |
| 5,121,329 | 6/1992 | Crump | 364/468 |
| 5,134,569 | 7/1992 | Masters | 156/272.8 |
| 5,147,587 | 9/1992 | Marcus et al. | 264/22 |
| 5,208,431 | 5/1993 | Uchiyama et al. | 219/121.84 |
| 5,233,150 | 8/1993 | Schneebeli et al. | 219/76.14 |
| 5,266,139 | 11/1993 | Yokota et al. | 156/180 |
| 5,303,141 | 4/1994 | Batchelder et al. | 364/468 |

FOREIGN PATENT DOCUMENTS

| | | | |
|---|---|---|---|
| 678500 | 1/1964 | Canada | 219/76.15 |
| 2583333 | 12/1986 | France . | |
| 3905684 | 8/1990 | Germany . | |
| 2-99286 | 4/1990 | Japan | 219/121.85 |
| 4-288974 | 10/1992 | Japan . | |
| 8806564 | 9/1988 | WIPO . | |

OTHER PUBLICATIONS

"Laser Solves Spotwelding Problems" by Schaffer in pp. 337–340 of *Source Book on Electron Beam and Laser Welding*, Mar. 1983.

*Primary Examiner*—Geoffrey S. Evans
*Attorney, Agent, or Firm*—James Creighton Wray

[57] ABSTRACT

A model making method and apparatus projects a linearly polarized laser beam from a laser source onto a mirror for circularly polarizing the beam and directing the circularly polarized beam vertically toward a rectilinearly movable stage for fusing a rectangular wire to a substrate or a previously fused wire layer on the stage. The circularly polarized beam projects through a center of a spool and a rotary stage and a support for the rotary stage and a rotary arm which is mounted on the rotary stage. The rotary arm supports a stepper feeder which draws the wire from the spool and pushes the wire through a nozzle, which radiuses the wire so that it lies flat and releases the wire near a focused spot of the circularly polarized laser beam. The rotating arm carries a lens mount on a pivot so that the lens which focuses the beam may traverse the wire for cutting the wire. Movement of the rectilinearly movable stage in a X–Y direction is controlled by a computer and stepper motors to follow a predetermined pattern of a cross-section of the model. The rotary arm turns on the rotary stage to release the wire tangentially to curvatures in the model outline. After each complete layer, the stage is stepped downward one wire thickness and the next layer is formed. The nozzle includes a gas jet passage for flooding the wire with inert gas as it is fused.

29 Claims, 1 Drawing Sheet

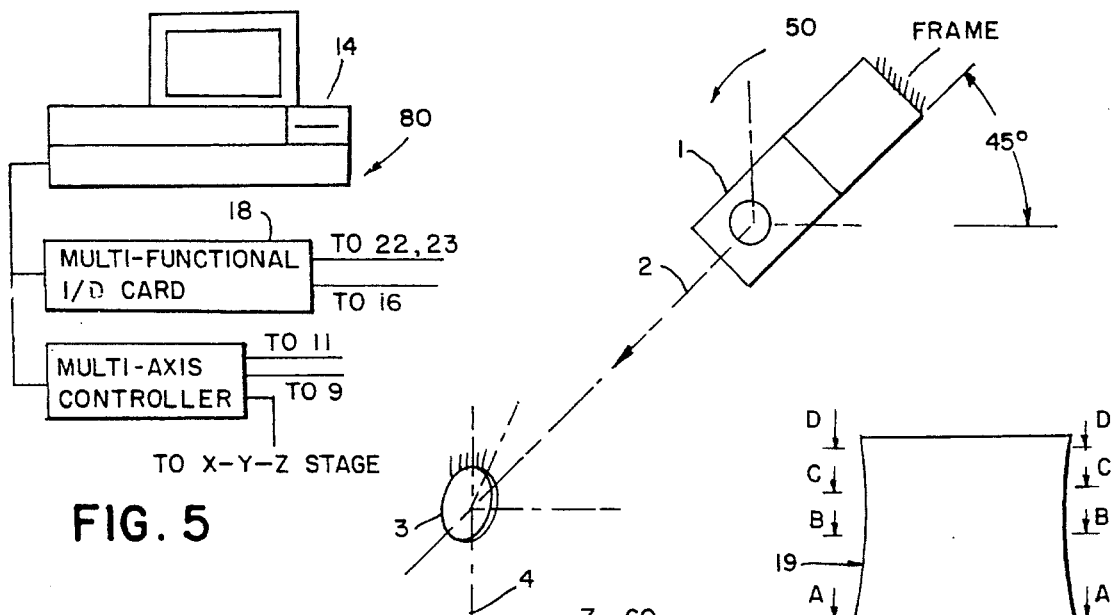
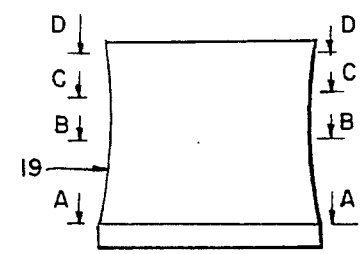
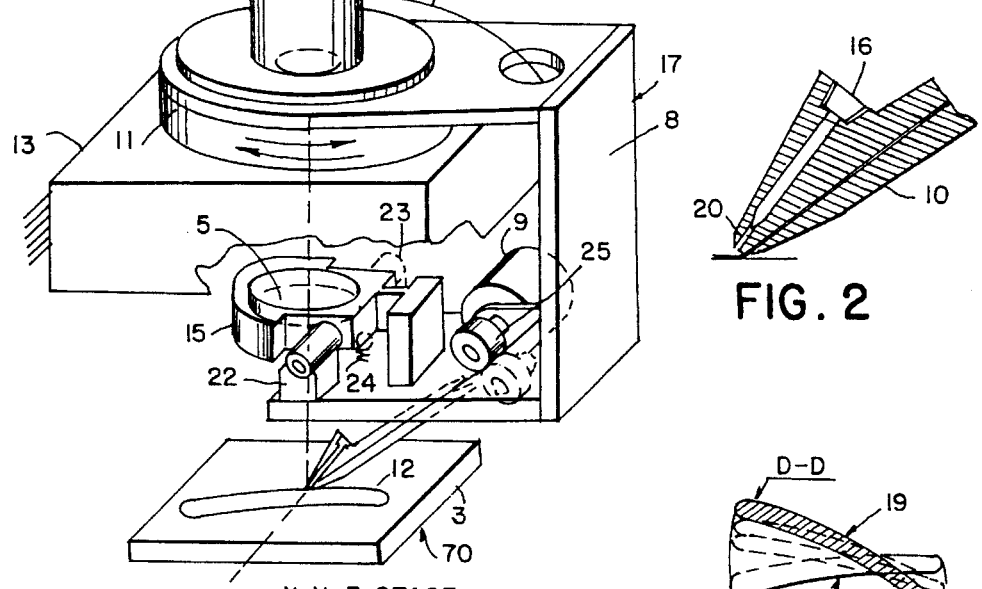
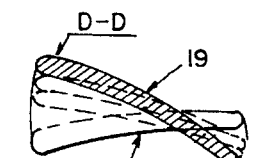
FIG. 5
FIG. 3
FIG. 2
FIG. 1
FIG. 4

RAPID PROTOTYPING SYSTEM

BACKGROUND OF THE INVENTION

The complexity of modern systems such as weapons, aircraft, ground transportation and the demands for their rapid development and qualification has resulted in the escalation of costs associated with their successful and timely introduction.

A revolutionary improvement in the cost and time of development of these systems could be realized if prototype models, scaled or full scale, of critical system components could be rapidly produced and subjected to proof testing.

Furthermore, the ability to conduct tests of these critical components early in their development would allow many more iterations of a design to be conducted in a short time, thus significantly improving the system's reliability, allowing early incorporation/evaluation of the system maintainability features, and significantly reducing the overall development time and cost.

There are three major 3-Dimensional model rapid prototyping methods currently available:

a. Photocurable liquid solidification or Stereolithography.

b. Selective Laser Sintering (SLS) or powder layer sintering.

c. Fused Deposition Modeling (FDM) or extruded molten plastic deposition method.

The above methods use geometric data from numerous currently available Computer Aided Design (CAD) solid modeling systems. This data is imported into a rapid prototyping system. A computer generated solid model is sliced into horizontal layers that are used as input for control of the rapid prototyping system.

Stereolithography is currently the most popular rapid prototyping method. Stereolithography generates a 3-D model by directing a laser beam onto the surface of a vat of liquid photocurable polymer. An elevator table in the polymer vat rests just below the liquid's surface. A laser beam is directed onto the polymer surface and solidifies it at the point of laser beam impingement. After a part slice at one depth has been made by scanning the laser beam back and forth in the shape of the model or pattern to be developed, the elevator platform upon which the model is being constructed drops the programmed amount. Another layer or slice is then created on top of the first in the same manner.

The process continues until the complete model has been constructed. After the construction phase is completed a curing process in a special curing apparatus is necessary.

The photocurable liquid plastics currently used in stereolithography are limited to acrylic plastics and produce parts with low strength and poor dimensional stability, especially during the transition through the curing process.

Selective Laser Sintering (SLS) generates a 3-D model by directing a laser beam onto a thin layer of plastic powder deposited on a target surface. The first layer corresponds to a first cross-sectional region of the part. The powder is sintered by operating the directed laser energy within the boundaries defining the first layer. A second layer of plastic powder is deposited on the first sintered layer, and the aim of the laser beam is scanned within the boundaries defining the second layer. Successive portions of powder are deposited onto the previously sintered layers until the complete model has been constructed.

A larger selection of plastic powder materials is used in this method. Plastics like PVC, Nylon, Polycarbonate and Wax are used. The part's quality and dimensional stability are sensitive to the powder moisture content and powder purity which strongly influence the laser beam energy absorption and powder sintering process. The parts produced by this method have poor dimensional stability and poor strength at relatively low temperatures.

Fused Deposition Modeling (FDM) generates a 3-D model by depositing extruded molten plastic in successive thin laminations in a pattern within the boundaries defining the part's layers. The material then solidifies as it is directed into place with an X–Y controlled extruding head nozzle that creates a thin laminate.

The thermoplastic melt temperature must be maintained within one degree Fahrenheit above the solidification point to secure proper adherence to the previous layer.

The materials used in the Fused Deposition Modeling method are limited to wax and plastic material with a melting temperature below 220 degrees Fahrenheit.

All of the above mentioned rapid prototyping methods are limited to applications for the prototype form evaluation or as a model used in further industrial processes, such as investment casting. The quality of these prototypes in terms of accuracy and dimensional stability is strongly dependent on particular qualities of the plastic materials used in the process and the process variations.

The accuracy of the 3-D models and their dimensional stability is also strongly dependent on process variations such as temperature of the processed plastic and its chemical purity and moisture content.

Those materials are limited to plastics with low melting temperatures and limited physical characteristics. The 3-D models produced with these rapid prototype methods have very poor strength, ductility and dimensional stability over time.

These material limitations make the previously existing methods unsuitable for producing prototype models which would have the materials of construction identical or close to the materials used in the final product. Therefore, the 3-D models produced on these systems are not suitable for model functional testing in the majority of cases.

A need exists for new and improved prototype modeling.

SUMMARY OF THE INVENTION

A new rapid prototyping system is based on fusion of a thin feedstock of metal and nonmetal materials which have various profiles, for example a rectangular-wire.

The new system generates a three-dimensional model by dispensing a feedstock, for example a thin strip of stainless steel, onto a substrate. The feedstock is fused to the substrate in a succession of overlying laminations, each having the thickness of the feedstock, and in a pattern within the boundaries defining the part's layers. Successive layers are deposited onto the previously fused layers until the complete model has been constructed.

The feedstock fusion is performed with a laser beam of the size and power density sufficient for reliable spot or continuous welding of the feedstock to the previous layer while keeping the feedstock cross section in substantially original shape.

The first layer corresponds to a first cross-sectional region of the part. The first layer is constructed by moving the substrate with the fused portion of the feedstock in the X–Y plane and relative to the axis along the laser beam and the feedstock point of contact with the substrate.

The substrate movements in the X–Y plane trace the boundary and interior of each cross-sectional region of the desired part. The feedstock dispensing nozzle is rotatable around the laser beam axis which allows the positioning of the feedstock delivery axis always in a direction tangential to the boundary curvature at any point in time. When the continuity of the feedstock must be interrupted, the deposited laser energy is increased to the level sufficient for cutting the feedstock.

The basic approach taken here solves major problems inherent in previous methods, and allows for achieving the quality target specifications detailed below.

The rapid prototyping system of the invention is capable of producing solid models out of a wide range of metal and nonmetal materials. Materials such as Ni-Cr stainless steel alloys, glass, polypropylene and polyethylene are readily available in the form of wire, fibers or strips, and have been laser welded and cut with excellent results.

Each layer's deposition is performed with a limited local heat input, thus insuring maximum dimensional stability of the 3-D model. No post curing is involved in this method.

The model's dimensional accuracy is significantly above the accuracy of the models made by stereolithography. The control of the feedstock deposition can be compared to the accuracy of the tool path of conventional numerical controlled machines.

The present system provides a method for rapid production of prototypes which have the materials of construction identical or close to the materials used in the final product.

The model's strength, dimensional accuracy and thermal stability are significantly higher than models made by prior art methods. Therefore the 3-D models produced on the system of the invention are suitable for functional testing.

The prototype system of the invention combines commercially available components using a personal computer, X,Y and Z positioning stages, rotary stage, step-motor controller cards with standard software utilities. A CO2 sealed laser system is employed.

A model building method includes fusing thin feedstock of metal and nonmetal materials which have various profiles, with a laser beam of a size and power density sufficient for a reliable spot or continuous weld of the feedstock to a previous layer while keeping the feedstock cross section in substantially original shape, producing a limited local heat input, and inducing a high accuracy and dimensional stability of a 3-D model, and good surface quality of the model results.

A substrate is moved in an X–Y plane and tracing the boundary and interior of each cross-sectional region of a desired part.

A feedstock dispensing nozzle is rotated around the laser beam axis.

The feedstock delivery axis is continuously positioned in a direction tangential to a boundary curvature of the model.

The feedstock is concurrently fed while fusing the feedstock.

A 3-D model building method includes feeding through a feedstock dispensing nozzle to a desired location a thin feedstock of metal and nonmetal materials which have various profiles. The feedstock is fused with a laser beam of a size and power density for producing a limited local heat input sufficient for a reliable spot or continuous welding of the feedstock to a previous fused layer while keeping the feedstock cross section in substantially original shape. A high accuracy and dimensional stability is produced, and a good surface quality of the 3-D model results.

A substrate on which the layer is produced is moved in X–Y directions on a plane transverse to the laser beam, and tracing the boundary and interior of each cross-sectional region of a desired part beneath the feeding of the feedstock. The feedstock dispensing nozzle is rotated around an axis of the laser beam. A delivery axis of the feedstock is continuously positioned in a direction tangential to the boundary curvature at a point where the feedstock is being fused to a previous layer.

The laser beam is formed by directing a linearly polarized beam from a laser source to a phase shifting mirror. The linearly polarized beam is converted to a circularly polarized laser beam at the mirror, and the circularly polarized beam is directed to a lens which focuses the beam to a spot on the feedstock.

The feedstock is stored on a spool, is drawn from the spool and is forced into the dispensing nozzle with a feedstock drive. The feedstock is curved in the dispensing nozzle before releasing the feedstock from the nozzle. Introducing nitrogen in the nozzle and releasing nitrogen from the nozzle near the feedstock floods the fusing.

The spool, the feedstock drive, the nozzle and the lens are rotated as an assembly around an axis of the laser beam. The axis of the laser beam and the assembly are moved along a line on which the feedstock is to be fused. The assembly is turned about the axis as the line curves, and the lens is moved and a beam spot is traversed across the feedstock for cutting the feedstock.

A preferred model building apparatus includes a frame. A laser beam source and a phase shift mirror are mounted on the frame. A feedstock delivery module support is also mounted on the frame. A rotary stage is mounted on the feedstock delivery module support, and a rotary arm is mounted on the rotary stage. A feedstock feeder is mounted on the rotary arm, and a laser beam focusing lens is mounted on the rotary arm. A feedstock storing spool is mounted on the rotary arm, and a flat wire feedstock is stored on the spool. A feedstock nozzle is connected to the rotary arm for receiving feedstock from the spool and feeder and for extending feedstock from a tip of the nozzle. The tip of the nozzle is aligned with a laser beam projected from the laser source to the mirror and through apertures in the support, rotating arm and rotary stage and through lens. A rectangularly movable stage is positioned beneath the nozzle for receiving feedstock in a predetermined pattern according to relative movement of the stage in an X–Y direction in relation to the frame. Feedstock extending from the nozzle tip is fused to a substrate or to previously fused layers of the feedstock for constructing a model by depositing and fusing successive layers of the feedstock.

The spool and the rotary stage and the lens are aligned on an axis of the laser beam.

The feeder has pinch rollers driven by a stepper motor.

The lens is mounted in a mount which is pivoted transverse to an axis of the laser beam. A driver is mounted on the rotary arm and is connected to the lens mount for moving the lens mount about the pivot for traversing a laser beam spot across the feedstock to cut the feedstock.

An inert gas passageway is mounted in the nozzle for flooding an intersection of the feedstock and the laser beam with inert gas during fusing of the feedstock.

The laser source produces a linearly polarized beam. The mirror converts the linearly polarized beam to a circularly polarized beam. The circularly polarized beam is focused by the lens on the feedstock which has just been released from the nozzle.

The nozzle has a feedstock passageway with a radius in the passageway near the tip of the nozzle for bending the feedstock in a radius to release the feedstock flat with the substrate or previous fused layer of feedstock.

A computer has a multi axis controller for controlling the rectilinearly movable stage.

A model making method and apparatus projects a linearly polarized laser beam from a laser source onto a mirror for circularly polarizing the beam and directing the circularly polarized beam vertically toward a rectilinearly movable stage for fusing a rectangular wire to a substrate or a previously fused wire layer on the stage. The circularly polarized beam projects through a center of a spool and a rotary stage and through a support for the rotary stage and a rotary arm which is mounted on the rotary stage. The rotary arm supports a stepper feeder which draws the wire from the spool and pushes the wire through the nozzle. The nozzle radiuses the wire so that it lies flat as the wire is released near a focused spot of the circularly polarized laser beam. The rotating arm carries a lens mount on a pivot so that the lens which focuses the beam may traverse the wire for cutting the wire. Movement of the rectilinearly movable stage in a X–Y direction is controlled by a computer and stepper motors to follow a predetermined pattern of a cross-section of the model. The rotary arm turns on the rotary stage to release the wire tangentially to curvatures in the model outline. After each complete layer, the stage is stepped downward one wire thickness, and the next layer is formed. The nozzle includes a gas jet passage for flooding the wire with inert gas as it is fused.

These and further and other objects and features of the invention are apparent in the disclosure, which includes the above and ongoing written specification, with the claims and the drawings.

BRIEF DESCRIPTION OF THE DRAWINGS

FIG. 1 schematically illustrates the main system components.

FIG. 2 schematically shows the dispensing nozzle.

FIG. 3 is a partial side elevation of a root portion of a model of a turbine blade constructed by the present invention.

FIG. 4 is a sectional end view of the turbine blade shown in FIG. 3.

FIG. 5 shows a computer used with the present invention.

DETAILED DESCRIPTION OF THE DRAWINGS

The preferred system includes the following major modules: beam delivery module 50; feedstock material delivery module 60; workpiece table module 70 and CAD/CAM data generation and the system control module 80.

Referring to FIG. 1, the beam delivery module 50 includes a CO2 laser 1 with a linearly polarized output beam 2, a phase shift mirror 3, a circularly polarized output beam 4 and an image lens 5.

The feedstock material delivery module 60 includes a rotary stage 11 on a fixed support bed 13. In a preferred embodiment, bed 13, laser source 1 and mirror 3 are mounted on a fixed frame. Alternatively, a movable frame supports a movable support bed 13 which moves with the laser generator and mirror 3 along the desired path, which follows the outline of the model layer being constructed. Spool 6 contains feedstock supply material 7, for example in the form of 304 stainless steel rectangular wire strip 0.010 inch thick by 0.020 inch wide. The feedstock 7 is pulled from the independently rotatable spool and is propelled through the dispensing arm 8 by means of a feed drive mechanism 9. The drive 9 pushes the feedstock through the dispensing nozzle 10, from which the feedstock is delivered onto the substrate 12.

Inert gas like nitrogen is delivered to the point of fusion through the line 16 and the nozzle 20, as shown in FIG. 2.

The dispensing arm 8, the feed drive mechanism 9, the dispensing nozzle 10 and the image lens 5 are connected in one unit assembly 17 which is rotatable by the controlled rotary stage 11 around the axis of the laser beam 4. The optical center of the image lens 5 coincides with the geometrical center of the beam 4.

The workpiece table module 70 consists of X,Y,Z axis stage 3, which supports substrate 12.

The CAD/CAM data generation and the system control module 80, as shown in FIG. 5, includes an IBM PC compatible 486 microprocessor based computer 14 with a multi axis controller and I/O card 18.

The system's CAD/CAM uses as input geometric data from currently available CAD solid modeling systems in the form of STL files.

The graphics module slices the 3-D CAD model into thin successive cross sectional layers. The slices correspond to the feedstock profile thickness, for example 010 inch, to be used in the construction of the part. On the basis of the cross sections the graphic module produces the toolpath in a form similar to numeric control machines G-code. The part example used for the description of the system operation is an aircraft compressor blade 19. The blade's root section is shown in FIG. 3 and FIG. 4, which shows sections A—A, B—B, C—C and D—D.

The tool path is generated by following the boundaries of the pattern defining the part's layers. The tool path is achieved by simultaneous motions of the workpiece table in the X and Y axis and of the dispensing nozzle by rotation around the axis of the laser beam 4.

The system generates a three-dimensional model by dispensing the feedstock strip 7 onto a substrate. A laser beam 4 of a spot size approximately 0.006 inch (0.15 mm) diameter is directed onto the strip at its point of contact with the substrate 12. The feedstock is fused onto the substrate in a succession of overlying laminations each having the thickness of the feedstock, and in the pattern within the boundaries defining the part's layers.

The first layer corresponds to the first cross-section of the part. It is constructed by moving the substrate with the fused portion of the feedstock in the X–Y plane and relative to the axis along the laser beam and the feedstock point of contact with the substrate.

The substrate movement in the X–Y plane traces the boundary and interior of each cross-section of the desired part. The feedstock dispensing nozzle is rotatable around the laser beam axis, allowing positioning of the feedstock delivery axis always in a direction tangential to the boundary curvature of each cross-section.

A small scanning stroke (0.020") of the image lens across the feedstock material allows the feedstock cutting operation. The scanning is performed by the deflection of the image lens holder/flexure 15 perpendicular to the feedstock orientation. The magnets 22 and 23 provide the necessary stroke. The indent in the lens holder and the ball and spring arrangement 24 provide the fixation of the lens holder in the neutral position, as shown in FIG. 1.

Successive layers are deposited onto the previously fused layers until the complete model has been constructed.

The system can be constructed with multiple feedstock materials for example a stainless steel strip and an organic or inorganic strip of material having the same thickness and each having its own dispensing nozzle. Each cross section can be built by alternating the material inside of the cross section. Thus the production of a composite material model is possible.

The beam delivery module 50 includes a Coherent Model DIAMOND 64 CO2 laser with power output of 150 W in the prototype system. The high quality of the laser results in a small focused spot which yields high power densities. That results in a small heat affected zone (HAZ), which minimizes heat spread to adjacent material. Combined with the laser's small size and its sealed design, that laser makes an excellent choice for the system.

Because of a linear polarization of the laser beam and the dependency of the laser cutting and welding properties on the material's orientation in relationship to the beam polarization plane, the use of a phase shift mirror is desirable. A phase shift mirror transforms a beam with linear polarization into a beam with circular polarization, which allows a consistent welding and cutting operation regardless of the material's orientation.

To obtain a circularly polarized beam from one of the mirrors, two angles have to be correctly set, as shown in FIG. 1. The phase shift mirror 3 is positioned with an incidence angle of 45 degrees. The laser beam output 2 with a plane of polarization parallel to the laser base is rotated 45 degrees to the plane of incidence.

The resulting circularly polarized beam is focused with the image lens 5 (F=2.5 inch) into a desired small spot on the image plane which lays at the point of impingement of the laser beam with the feedstock top surface. A Melles Griot Zinc Selenide Positive Lens with focal distance of 63.5 mm (2.5 inches) is used for the image lens 5.

The feedstock material delivery module 60 uses an AEROTECH rotary stage ART300 Series equipped with a stepper motor with an encoder and a home marker, and having a stage resolution of 0.1 arc minute. The rotary stage is provided with an aperture at its center of rotation to allow the laser beam to pass through. The following subassemblies are attached to the rotary stage.

A feedstock spool 6 stores a 0.010"×0.020" flat wire. A flat wire feed mechanism 9 extracts a continuous wire from the spool and delivers the wire through the dispensing nozzle 10 to the substrate for subsequent fusion. The feed mechanism includes friction rollers 25 driven by a stepper-motor and encoder Escap P300 series. The feed speed is controlled by the system controller.

The feedstock dispensing nozzle 10 incorporates a wire guide groove of the shape and dimensions which will allow a sliding movement of the flat wire inside the dispensing nozzle. The tip of the nozzle is positioned slightly above the top surface of the current layer, as shown in FIG. 2. The end of the nozzle has a radial shape which induces a radial shape to the flat wire to deliver it tangentially to the substrate.

That feature allows the initial close contact of the flat wire with the substrate during initialization of the wire fusion process. This close contact is important for a successful welding operation. Close contact with the substrate or the previous layers is maintained at all times because of the wire straightening forces which are induced by the substrate motion away from the dispensing nozzle tip.

The feed of the flat wire should be synchronized with and correspond to the speed of the substrate motion around the cross-section boundary at any given moment. Initially the system may be maintained at a constant speed around the boundary.

The workpiece table module 70 uses an AEROTECH Precision X–Y–Z AT0200 Series stage. The stage is driven by stepper motors equipped with encoders.

The system control module 80 uses a Delta Tau Data System PMAC-NC motion controller. The PMAC's capabilities are ideally suited for use in Computer Numerical Control (CNC) machine tools. The PMAC-NC controller supports the traditional CNC machine G-Code. The PMAC-NC-M software package enables a host IBM PC computer to be programmed as a CNC controller. The controller is multi axis with the capabilities of 8-axis simultaneous control of the AEROTECH X–Y–Z linear motion stage, the rotary stage and the Escap P300 stepper motor of the flat wire feed mechanism. An eight position I/O card such as OPTO-22 can be connected directly to the PMAC, allowing control of the image lens scanning actuators and the nitrogen flow control solenoid valve.

The system's CAD/CAM data generation module uses as input geometric data from currently available CAD solid modeling systems in the form of .STL files.

The graphic module slices the 3-D CAD model into thin successive cross sectional layers. These correspond to the feedstock profile thickness that are to be used in the construction of the part.

While the invention has been described with reference to specific embodiments, modifications and variations of the invention may be constructed without departing from the scope of the invention, which is defined in the following claims.

I claim:

1. A model building method comprising delivering thin, continuous feedstock of materials which have various profiles with opposite flat sides and fusing the feedstock by adhesion or welding a flat side with an energy source to a flat side of a previous layer, while keeping the feedstock cross-section in substantially original shape.

2. The method of claim 1, further comprising moving a substrate in an X–Y plane and tracing the boundary and interior of each cross-sectional region of a desired part.

3. The method of claim 1, wherein the feedstock materials comprise metal materials for fabricating metal parts.

4. The method of claim 1, wherein the feedstock materials comprise nonmetal materials for fabricating nonmetal parts.

5. The method of claim 1, further comprising concurrently feeding the feedstock while fusing the feedstock.

6. A 3-D model building method comprising feeding through a feedstock dispensing nozzle to a desired location, a thin feedstock of metal and nonmetal materials which have various profiles with opposite flat sides, fusing the feedstock with an energy source of a size and power density for producing a limited local heat input sufficient for a reliable spot or continuous welding of a flat side of the feedstock to a flat side of a previous layer, while keeping the feedstock cross-section in substantially original shape, whereby a 3-D model with dimensional stability and a good surface quality is produced.

7. A model building method comprising fusing thin feedstock of materials which have various profiles by adhesion or welding with an energy source to a previous layer, while keeping the feedstock cross-section in substantially original shape, further comprising moving in X–Y directions a substrate on which the layer is produced on a plane transverse to the energy source and tracing the boundary and interior of each cross-sectional region of a desired part beneath the feeding of the feedstock, rotating the feedstock dispensing nozzle around an axis of the energy source, and continuously positioning a delivery axis of the feedstock in a direction tangential to the boundary curvature at a point where the feedstock is being fused to a previous layer.

8. The method of claim 7, wherein the energy source is a laser beam.

9. The method of claim 8, further comprising storing the feedstock on a spool, drawing the feedstock from the spool and forcing the feedstock into the dispensing nozzle with a feedstock drive, curving the feedstock in the dispensing nozzle before releasing the feedstock from the nozzle, introducing nitrogen in the nozzle and releasing nitrogen from the nozzle near the feedstock.

10. The method of claim 9, further comprising rotating the spool, the feedstock drive, the nozzle and the lens as an assembly around an axis of the laser beam, relatively moving the axis of the laser beam and the assembly along a line on which the feedstock is to be fused, turning the assembly about the axis as the line curves, and moving the lens and traversing a beam spot across the feedstock for cutting the feedstock.

11. The method of claim 8, further comprising forming the laser beam by directing a linearly polarized beam from a laser source to a phase shifting mirror, converting the linearly polarized beam to a circularly polarized laser beam at the mirror, and directing the circularly polarized beam to a lens and focusing the beam with the lens to a spot on the feedstock.

12. A model building method comprising fusing thin feedstock of materials which have various profiles by adhesion or welding with an energy source to a previous layer, while keeping the feedstock cross-section in substantially original shape, further comprising tracing the boundary and interior of each cross-sectional region of a desired part in an X–Y plane, further comprising rotating a feedstock dispensing nozzle around the energy source.

13. The method of claim 12, further comprising continuously positioning a feedstock delivery axis in a direction tangential to a boundary curvature of a model.

14. A model building method comprising delivering thin, continuous feedstock of materials which have various profiles and fusing the feedstock by adhesion and/or welding with an energy source, to a previous layer, while keeping the feedstock cross-section in substantially original shape, wherein the feedstock materials comprise alternating metal and nonmetal materials as multiple feedstock materials within a cross-section for fabricating composite material parts.

15. A model building method comprising delivering thin, continuous feedstock of materials which have various profiles and fusing the feedstock by adhesion or welding with an energy source to a previous layer, while keeping the feedstock cross-section in substantially original shape, wherein the feedstock materials comprise a combination of metal and nonmetal materials as a single feedstock material for fabricating composite material parts.

16. A model building method comprising delivering a continuous flat wire feedstock to a previous layer and fusing the feedstock to the previous layer while keeping the feedstock substantially in its original solid cross-section, wherein the delivering further comprises delivering the feedstock through a delivery nozzle and rotating the delivery nozzle about a point of impingement of the energy beam with the previous layer for providing tracing of desired model shapes without feedstock melting.

17. A model building method comprising fusing solid feedstock materials, with various profiles, to a substrate by adhesion using an energy source such that the feedstock substantially maintains its solid cross-section, further comprising rotating a feedstock delivery nozzle about a fusing point of contact of the energy source with the feedstock, such that the solid feedstock is controllably deformed about the fusing point of contact and accurate complex shapes in an X–Y plane are generated without transforming the solid cross-section of the feedstock.

18. A model buildings apparatus comprising a frame, a laser beam source mounted on the frame, a mirror mounted on the frame, and a feedstock delivery module support mounted on the frame, a rotary stage mounted on the feedstock delivery module support and a rotary arm mounted on the rotary stage, a feedstock feeder mounted on the rotary arm and a laser beam focusing lens mounted on the rotary arm, a feedstock storing spool mounted on the rotary arm and a flat wire feedstock stored on the spool, a feedstock nozzle connected to the rotary arm for receiving feedstock from the spool and feeder and for extending feedstock from a tip of the nozzle, the tip of the nozzle being aligned with a laser beam projected from the laser source to the mirror and through the support, rotating arm and rotary stage and lens, a rectangularly movable stage positioned beneath the nozzle for receiving feedstock in a predetermined pattern according to relative movement of the stage in an X–Y direction in relation to the frame for receiving the feedstock extending from the nozzle tip and for fusing the feedstock to a substrate or to a previously fused layer of the feedstock for constructing a model by depositing and fusing successive layers of the feedstock.

19. The apparatus of claim 18, wherein the spool and the rotary stage and the lens are aligned on an axis of the laser beam.

20. The apparatus of claim 18, wherein the feedstock feeder comprises pinch rollers driven by a stepper motor.

21. The apparatus of claim 18, wherein the lens is mounted in a mount which is pivoted transverse to an axis of the laser beam, and further comprising a driver mounted on the rotary arm and connected to the lens mount for moving the lens mount along the pivot for traversing a laser beam spot across the feedstock for cutting the feedstock.

22. The apparatus of claim 18, further comprising an inert gas passageway mounted in the nozzle for flooding an intersection of the feedstock and the laser beam with inert gas during fusing of the feedstock.

23. The apparatus of claim 18, wherein the laser source produces a linearly polarized beam, and wherein the mirror converts the linearly polarized beam to a circularly polarized beam, and wherein the circularly polarized beam passes through the lens to the feedstock which has just been released from the nozzle.

24. The apparatus of claim 18, wherein the nozzle has a feedstock passageway with a radius in a feedstock passageway near the tip of the nozzle for bending the feedstock in a radius to release the feedstock flat with the substrate or previous fused layer of feedstock.

25. The apparatus of claim 18, further comprising a computer having a multi axis controller for controlling the rectilinearly movable stage, the rotary stage and the feedstock feeder mechanism.

26. A model building method comprising delivering a continuous preformed flat wire feedstock to a previous layer, directing an energy beam to the feedstock and fusing a flat surface of the feedstock to a flat surface of the previous layer, while keeping the feedstock substantially in its original preformed solid cross-section.

27. The method of claim 26 wherein the delivering further comprises delivering the feedstock substantially tangentially to the previous layer.

28. The method of claim 26, wherein the directing further comprises scanning and traversing the beam across the feedstock.

29. The method of claim 26, wherein the delivering comprises delivering the flat wire feedstock through a delivery nozzle, and further comprising bending the flat wire feedstock as it leaves the nozzle.

* * * * *